United States Patent
Kondo et al.

(10) Patent No.: US 10,215,091 B2
(45) Date of Patent: Feb. 26, 2019

(54) ANTI-VIBRATION DEVICE FOR VEHICLE

(71) Applicant: NISSAN MOTOR CO., LTD., Yokohama-shi, Kanagawa (JP)

(72) Inventors: Masahiko Kondo, Kanagawa (JP); Yoshinori Hirano, Kanagawa (JP); Keiichiro Matsumoto, Kanagawa (JP); Koji Tanimura, Kanagawa (JP); Shunsuke Ebata, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 65 days.

(21) Appl. No.: 15/513,697

(22) PCT Filed: Sep. 29, 2014

(86) PCT No.: PCT/JP2014/075885
§ 371 (c)(1),
(2) Date: Mar. 23, 2017

(87) PCT Pub. No.: WO2016/051461
PCT Pub. Date: Apr. 7, 2016

(65) Prior Publication Data
US 2017/0292444 A1  Oct. 12, 2017

(51) Int. Cl.
*F02B 75/32* (2006.01)
*F02B 75/04* (2006.01)
(Continued)

(52) U.S. Cl.
CPC ............. *F02B 75/32* (2013.01); *F02B 75/04* (2013.01); *F02B 77/00* (2013.01); *F02D 15/02* (2013.01); *F16F 15/02* (2013.01); *F16F 15/08* (2013.01)

(58) Field of Classification Search
CPC .... F16F 7/00; F16F 7/10; F16F 7/1017; F16F 7/112; B60K 5/04; B60K 5/12;
(Continued)

(56) References Cited

U.S. PATENT DOCUMENTS

| 1,767,015 A * | 6/1930 | Sardeson | ............. B60K 5/1216 |
| | | | 180/291 |
| 4,132,194 A * | 1/1979 | Saito | ........................ F02D 35/00 |
| | | | 123/672 |

(Continued)

FOREIGN PATENT DOCUMENTS

| EP | 2 450 593 A1 | 5/2012 |
| EP | 2 738 028 A1 | 6/2014 |

(Continued)

*Primary Examiner* — Terrell L McKinnon
*Assistant Examiner* — Michael McDuffie
(74) *Attorney, Agent, or Firm* — Foley & Lardner LLP (57) ABSTRACT

A variable compression ratio engine (1) is provided with a multi-link mechanism (101) between a piston (102) and a crankshaft (103). The multi-link mechanism (101) includes an upper link (104), a lower link (105) and a control link (106). An anti-vibration device (6) for vehicles is attached between the upper part of the engine (1) and a vehicle body to which the engine (1) is mounted. The anti-vibration device (6) includes a rod body (63) having a first elastic connecting part (61) at one end and a second elastic connecting part (62) at another end. The first elastic connecting part (61) is connected to the engine (1). The second elastic connecting part (62) is connected to the vehicle body. The anti-vibration device (6) further includes an inertial mass (641) supported by the rod body (63), an actuator (64) configured to reciprocate the inertial mass (641) in an axial direction (C) of the rod body (63), and a control unit (65) configured to control the actuator (64) so that the inertial mass (641) receives force in accordance with a displacement speed of the rod body (63) in the axial direction (C). The rod (Continued)

body (63) has a rigid body resonance frequency lower than a resonant frequency of bending and torsion of the engine (1).

7 Claims, 10 Drawing Sheets

(51) Int. Cl.
    *F02B 77/00*     (2006.01)
    *F16F 15/02*     (2006.01)
    *F16F 15/08*     (2006.01)
    *F02D 15/02*     (2006.01)

(58) Field of Classification Search
    CPC .. B60K 5/1208; B60K 5/1216; B60K 5/1241; B60K 5/1266
    USPC ....... 248/564, 566, 567, 568, 570, 584, 591, 248/592, 593, 595, 638; 180/292
    See application file for complete search history.

(56) References Cited

U.S. PATENT DOCUMENTS

| | | | | |
|---|---|---|---|---|
| 4,403,762 A | * | 9/1983 | Cogswell, II | F16F 7/108 188/379 |
| 4,610,420 A | | 9/1986 | Fukushima et al. | |
| 4,909,489 A | * | 3/1990 | Doi | F16F 13/30 248/566 |
| 5,082,252 A | * | 1/1992 | Miyamoto | F16F 13/18 180/312 |
| 5,103,943 A | * | 4/1992 | Ide | B60K 5/1208 180/300 |
| 5,293,974 A | * | 3/1994 | Bietenhader | B64C 27/001 188/379 |
| 5,364,061 A | * | 11/1994 | Ciolczyk | B60K 5/1241 180/300 |
| 5,413,014 A | * | 5/1995 | Kameda | B60K 5/04 180/297 |
| 6,454,236 B2 | * | 9/2002 | Garaud | F01N 13/1822 248/60 |
| 7,156,214 B2 | * | 1/2007 | Pradel | F16F 9/466 188/300 |
| 8,684,340 B2 | * | 4/2014 | Smith | B64C 27/001 248/566 |
| 9,689,457 B2 | * | 6/2017 | Kojima | B60K 5/1241 |
| 2001/0032919 A1 | * | 10/2001 | Hagino | F16F 13/264 248/562 |
| 2011/0192371 A1 | | 8/2011 | Satou | |
| 2012/0098177 A1 | | 4/2012 | Satou et al. | |
| 2014/0124645 A1 | | 5/2014 | Satou et al. | |
| 2014/0137830 A1 | | 5/2014 | Satou et al. | |
| 2015/0053496 A1 | * | 2/2015 | Jomaa | G06F 17/50 180/292 |

FOREIGN PATENT DOCUMENTS

| | | |
|---|---|---|
| JP | 57-150020 | 9/1982 |
| JP | 58-202110 A | 11/1983 |
| JP | 3-36421 Y2 | 8/1991 |
| JP | 5327361 B2 | 10/2013 |
| WO | WO 2013/161544 A1 | 10/2013 |

\* cited by examiner

ANTI-VIBRATION DEVICE FOR VEHICLE

TECHNICAL FIELD

The present invention relates to an anti-vibration device for vehicles that suppresses transmission of vibrations from an engine, such as an internal-combustion engine, to a vehicle body.

BACKGROUND ART

A variable compression ratio engine provided with a multi-link mechanism is known (Patent Document 1: JP5327361B). The multi-link mechanism comprises an upper link, lower link and control link and is provided between the piston and the crankshaft. Variable compression ratio engines of this type realize low fuel consumption under low load conditions by setting a high compression ratio and suppress knocking due to a boost pressure within a high load region by setting a low compression ratio.

PRIOR ART DOCUMENT

Patent Document

[Patent Document 1] JP5327361B

SUMMARY OF INVENTION

Problems to be Solved by Invention

The above variable compression ratio engine of the prior art outputs a higher torque compared with engines of the same power capacity range and it is therefore necessary to further enhance the rigidity of a mount structure for the engine. When the rigidity of the mount structure is enhanced, however, vibrations transmitted to the vehicle body increase to deteriorate the quietness in the vehicle cabin, which may be problematic.

A problem to be solved by the present invention is to provide an anti-vibration device for vehicles that suppresses vibrations transmitted from a variable compression ratio engine to a vehicle body.

Means for Solving Problems

The present invention solves the above problem by providing an anti-vibration device for vehicles. The anti-vibration device includes a rod body and an actuator. The rod body couples a pair of elastic connecting parts at both ends. One of the elastic connecting parts is connected to an engine and the other is connected to a vehicle body. The actuator reciprocates an inertial mass in the axial direction of the rod body. The engine is a variable compression ratio engine provided with a multi-link mechanism between a piston and a crankshaft. The multi-link mechanism includes a plurality of links. The anti-vibration device is attached between an upper part of the engine and the vehicle body. The rod body has a rigid body resonance frequency that is set lower than a resonant frequency of bending and/or torsion of the engine.

Effect of Invention

According to the present invention, the mount rigidity of the variable compression ratio engine is enhanced because, in this engine, the operation and action of the multi-link mechanism cancels vibrations of the torque fluctuation in the vertical and transverse directions and such vibrations due to combustion. Moreover, pitching vibrations of the engine can be suppressed by reciprocating the inertial mass in accordance with a displacement speed in the axial direction input to the rod body of the anti-vibration device for vehicles. This can suppress booming noises and the like particularly under low load conditions.

MODE(S) FOR CARRYING OUT THE INVENTION

Figure 1A:
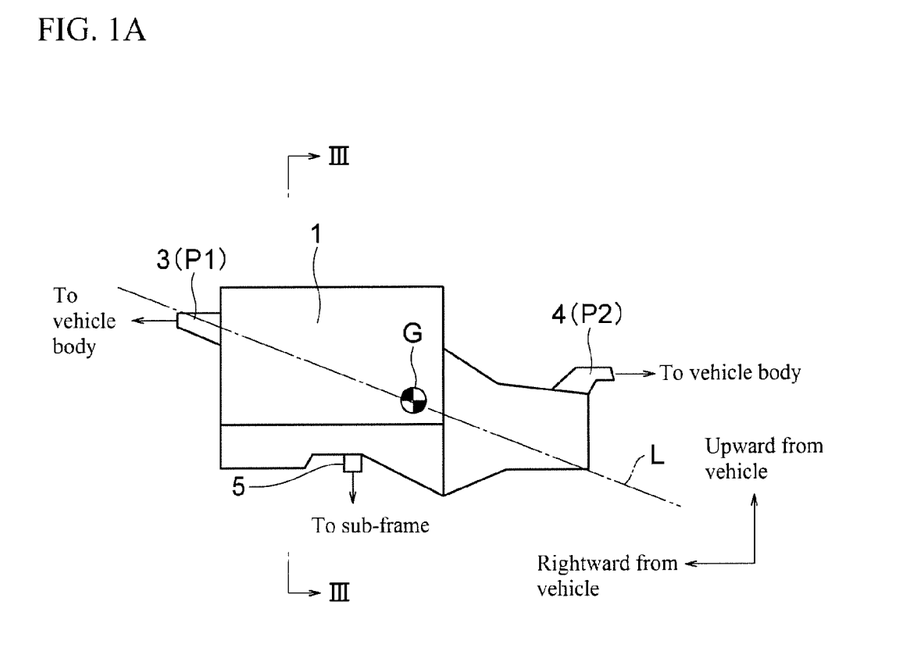
FIG. 1A is a front elevational view illustrating an example in which an embodiment of the anti-vibration device for vehicles according to the present invention is applied to an upper torque rod that connects between a variable compression ratio engine and a vehicle body.
Figure 1B:
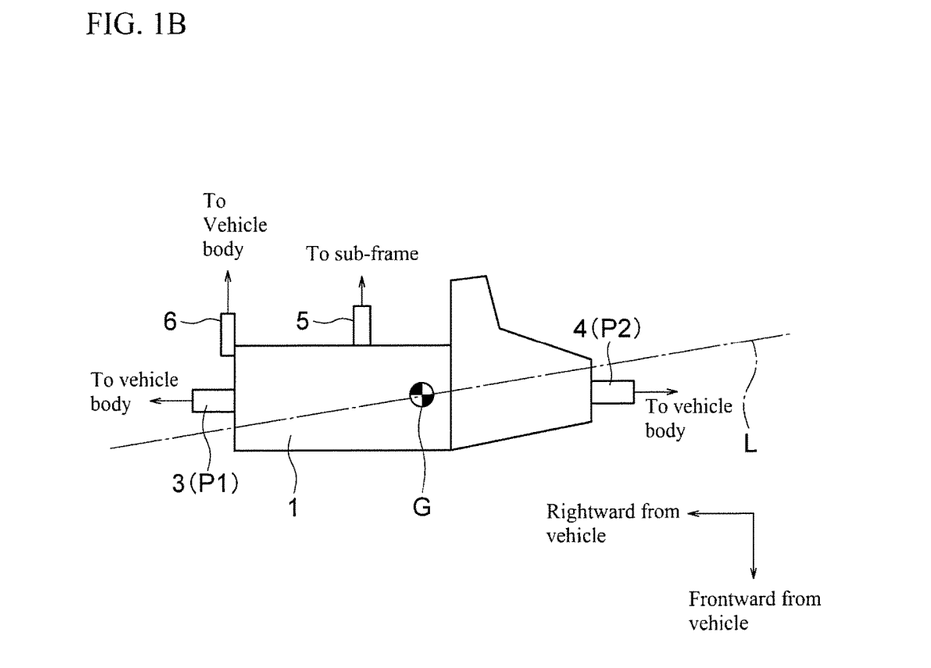
FIG. 1B is a plan view of FIG. 1A.
Figure 2:
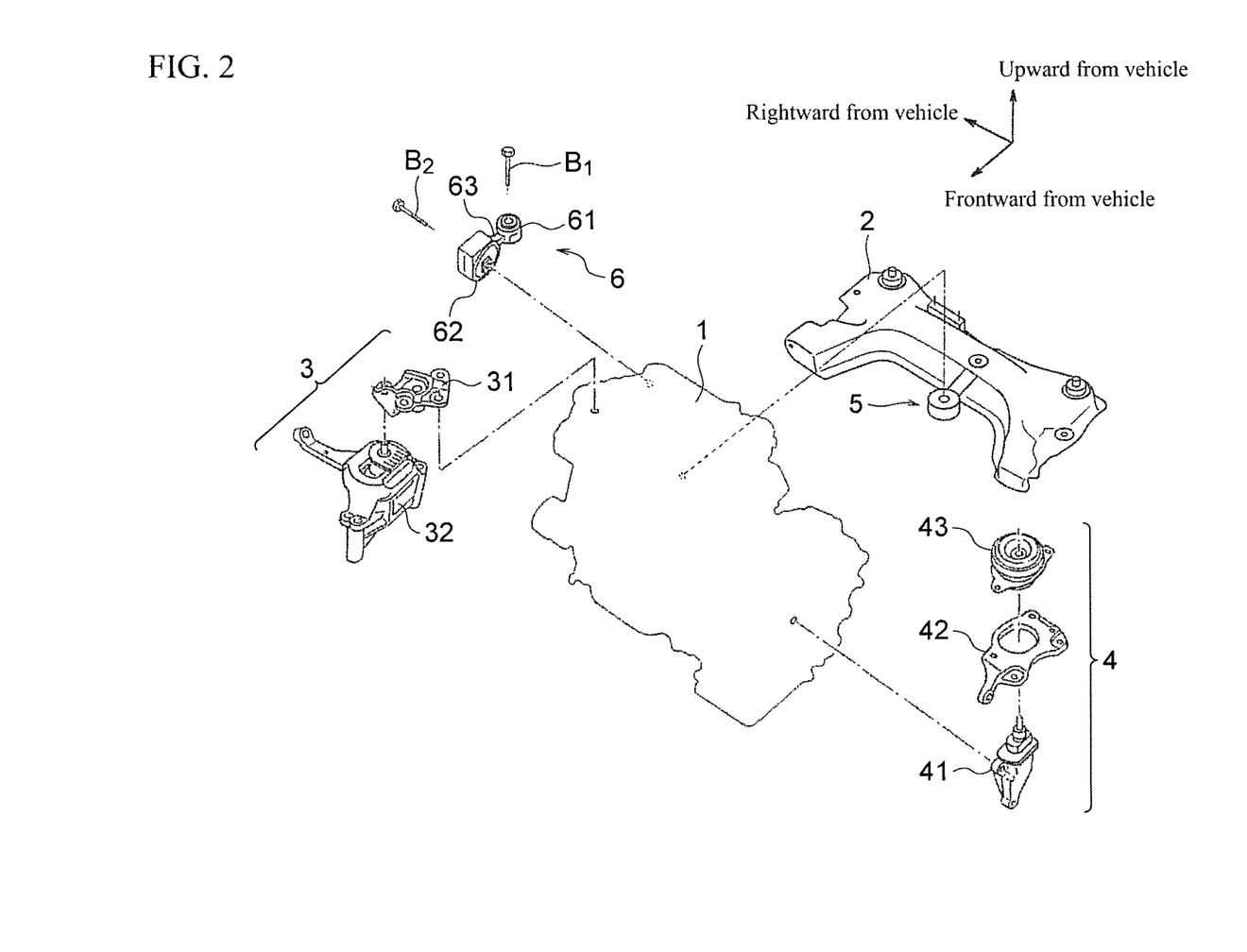
FIG. 2 is an exploded perspective view illustrating engine mounts and torque rods of FIG. 1A and FIG. 1B.

Referring initially to FIG. 1A to FIG. 3, an example is illustrated in which a variable compression ratio engine is mounted to a vehicle body by means of a so-called pendulum mount structure. One or more embodiments of the anti-vibration device for vehicles according to the present invention can be applied to such an example. FIG. 1A is a front elevational view (schematic view) when an example, in which an embodiment of the anti-vibration device according to the present invention is applied to the engine of a vehicle, is viewed from front of the vehicle to the rear, FIG. 1B is a plan view (schematic view) of FIG. 1A, and FIG. 2 is an exploded perspective view illustrating the engine, engine mounts and torque rods of FIG. 1A and FIG. 1B.

The supporting structure for an engine 1 by means of a pendulum mount structure refers to a supporting structure in which, for the engine 1 of a so-called transverse-mounted type with its principal inertial axis L disposed as illustrated in FIG. 1A and FIG. 1B, two supporting points P1 and P2 mainly supporting the engine 1 are provided to be positioned, in the plan view of FIG. 1B, at axially opposite sides with respect to the center of gravity G of the engine 1 on the principal inertial axis L of the engine 1 and, in the front elevational view of FIG. 1A, the supporting point P1 is provided to be positioned on the principal inertial axis L while the supporting point P2 is provided to be positioned above the principal inertial axis L with respect to the vehicle. In a specific structure as illustrated in FIG. 2, the two supporting points P1 and P2 are composed of a right engine mount 3 (which is the supporting point P1) and a left engine mount 4 (which is the supporting point P2). The right engine mount 3 is configured to include a right engine mount bracket 31 that is fixed to the engine 1 and a right engine mount insulator 32 that is fixed between the right engine mount bracket 31 and the vehicle body. The left engine mount 4 is configured to include a left engine mount bracket 41 that is fixed to the engine 1, a left engine mount bracket support 42, and a left engine mount insulator 43 that is fixed between the left engine mount bracket support 42 and the vehicle body.

The supporting structure for an engine by means of a pendulum mount structure is configured such that the engine 1 is supported like a suspended pendulum and the center of gravity G of the engine, which swings about a straight line connecting the support points P1 and P2, is restrained by rod-like members, such as torque rod assemblies 5 and 6 (also referred to as a lower torque rod 5 and an upper torque rod 6, hereinafter), of which each one end is attached to the vehicle body. The anti-vibration effects comparable to those of the prior art can be advantageously obtained with less number of parts. This will be more specifically described. In the engine 1 mounted to the vehicle body by means of the pendulum mount structure, the engine 1 swings or tilts about an axis connecting the two support points P1 and P2 (in the pitching direction) during the operation of the engine 1 due to a rotational inertial force. To prevent this tilting motion and to support the engine 1, the upper torque rod 6 and the lower torque rod 5 are provided. The upper torque rod 6 couples the roughly upper half of the engine 1 and a vehicle body side member while the lower torque rod 5 couples the remaining lower half of the engine 1 and the same or different vehicle side member. The upper torque rod 6 is coupled to the engine 1 from the upper right side of the vehicle and the other, lower torque rod 5 is coupled to the engine 1 from the lower side of the vehicle. These two torque rods 5 and 6 thus prevent the tilting motion of the engine 1 mounted by means of the pendulum mount structure.

The engine 1 of the present embodiment is, for example, an in-line four-cylinder engine, which may be a variable compression ratio engine with a multi-link mechanism. In particular, when a balance shaft is provided as in engines of a relatively large displacement (such as 2 L or more engine displacement), since the unbalanced inertial force is small at the basic order of engine rotation (second order component), mainly the reaction force of the engine torque fluctuation acts on the engine 1. It is therefore apparent to the present inventors that, at the basic order of engine rotation, the in-vehicle sound and in-vehicle vibration occur due to input from the above two torque rods 5 and 6 which support the torque. It is also known that the in-vehicle sound up to about 1000 Hz, which is composed of higher orders than the basic order, may be a problem for the passengers, such as during acceleration of the vehicle. In one or more embodiments as described below, an example will be described in which the anti-vibration device for vehicles according to the present invention is applied to an engine supported by means of the pendulum mount structure, but the anti-vibration device for vehicles according to the present invention is not limited only to being applied to engines of the pendulum mount structure and can also be applied to engines of other supporting structures than the pendulum mount structure.

Figure 3:
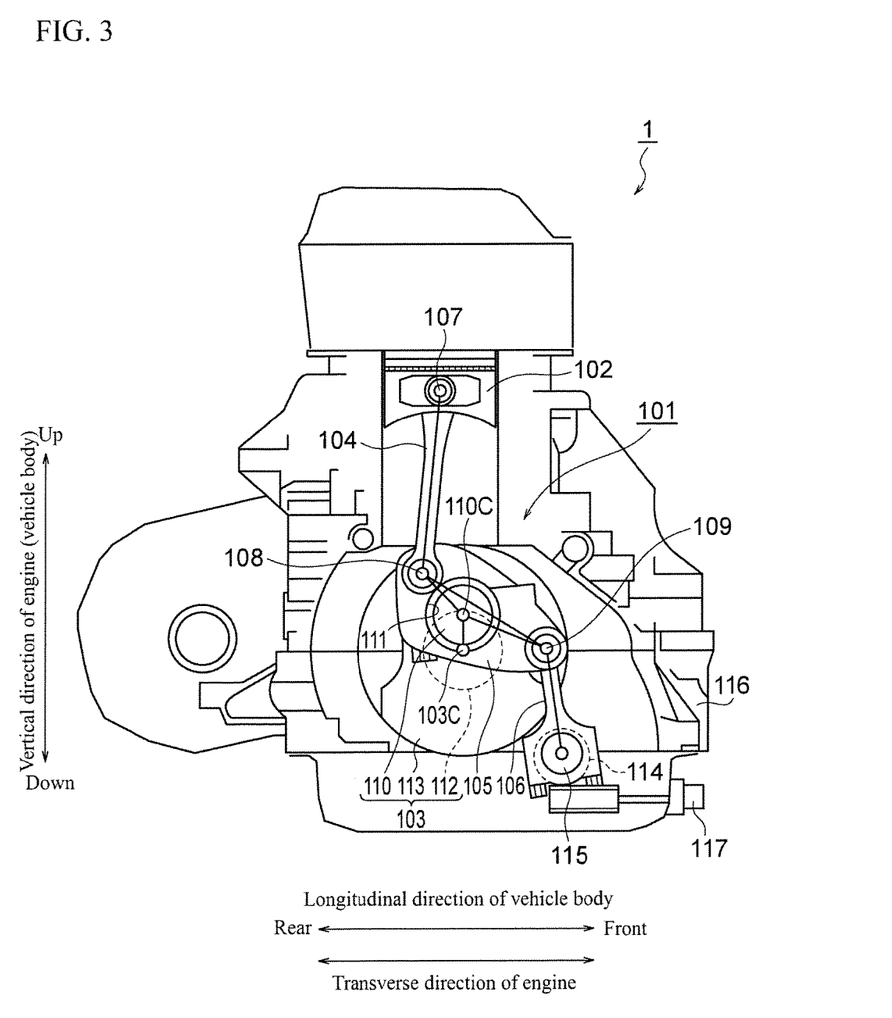
FIG. 3 is a cross-sectional view illustrating an example of the variable compression ratio engine of FIG. 1A, that is, a cross-sectional view along line of the figure.

The configuration and action of the variable compression ratio engine 1 of the present embodiment will then be described. FIG. 3 is a cross-sectional view illustrating an example of the variable compression ratio engine of the present embodiment illustrated in FIG. 1A and FIG. 1B, that is, a cross-sectional view along line of FIG. 1A. The variable compression ratio engine 1 of the present embodiment is an in-line four-cylinder engine. FIG. 3 illustrates a cross section of one cylinder. Each cylinder of the engine 1 of the present embodiment is equipped with a multi-link mechanism (compression ratio varying mechanism) 101 that is contrived to vary a compression ratio by changing a piston top dead center position. The multi-link mechanism 101 connects a piston 102 to a crankshaft 103 via an upper link 104 and lower link 105 and controls an orientation of the lower link 105 using a control link 106 thereby to change the compression ratio.

The upper link 104 is coupled at its upper end to the piston 102 via a piston pin 107 and pivotally about the piston pin 107. The upper link 104 is coupled at its lower end to one end of the lower link 105 via an upper pin 108 and pivotally about the upper pin 108. The other end of the lower link 105 is coupled to the control link 106 via a control pin 109 and pivotally about the control pin 109.

The lower link 105 is formed with a coupling hole 111 to which a crankpin 110 is coupled such that the crankpin 110 is located between the center axis of the upper pin 108 and the center axis of the control pin 109. The lower link 105 has the coupling hole 111 approximately at the middle of the lower link 105 and is configured to be dividable into two upper and lower members in the figure so that the lower link 105 can be assembled with the crankpin 110 afterward. The crankpin 110 of the crankshaft 103 is inserted in the coupling hole 111 thereby to allow the lower link 105 to pivot about the crankpin 110.

The crankshaft 103 comprises a crankpin 110, a journal 112 and a counterweight 113. The center axis 110C of the crankpin 110 is offset from the center axis of the journal 112 (i.e. the axis of rotation of the crankshaft 103C) by a prescribed amount. The counterweight 113 is formed integrally with a crank arm to reduce a first-order rotational vibration component associated with the piston movement.

The upper end of the control link 106 is coupled to the lower link 105 via the control pin 109 and pivotally about the control pin 109. The lower end of the control link 106 is coupled to an eccentric shaft part (pivot shaft) 115 of a control shaft 114. The control link 106 pivots about the eccentric shaft part 115. The control shaft 114 is arranged parallel to the crankshaft 103 (parallel to the direction perpendicular to the plane of the figure) and rotatably supported by a cylinder block 116. The eccentric shaft part 115 of the control shaft 114 is formed at a position that is offset from the center axis of the control shaft 114 by a prescribed amount. The control shaft 114 is rotationally controlled by an actuator 117 via an appropriate mechanism, such as worm & worm wheel, to move the eccentric shaft part 115.

When the actuator 117 rotates the control shaft 114 to move the eccentric shaft part 115 downward relative to the center axis of the control shaft 114, the lower link 105 pivots about the crankpin 110 in a direction in which the position of the upper pin 108 moves relatively upward. This operation allows the top dead center position of the piston 102 to move upward to increase the geometric compression ratio (ratio of the combustion chamber volume at the piston bottom dead center position to the combustion chamber volume at the piston top dead center position) of the engine 1. Conversely, when the eccentric shaft part 115 moves upward relative to the center axis of the control shaft 114, the lower link 105 pivots about the crankpin 110 in a direction in which the position of the upper pin 108 moves relatively downward. This operation allows the top dead center position of the piston 102 to move downward to reduce the compression ratio of the engine 1. As will be understood, the actual effective compression ratio varies depending of the timing of opening and closing of air intake valves in addition to the above-described geometric compression ratio.

Figure 4:
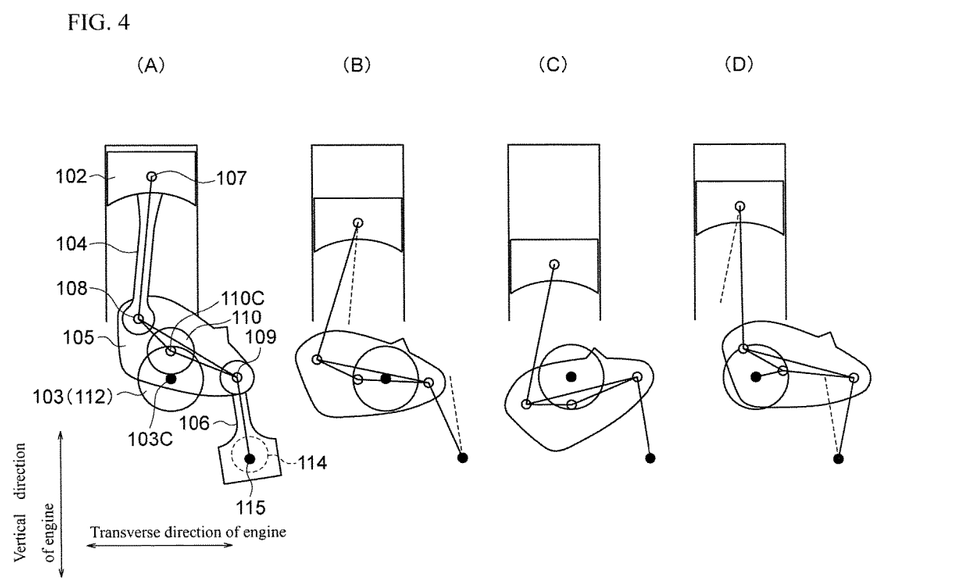
FIG. 4 is a set of schematic views illustrating one reciprocating operation (half cycle) of the variable compression ratio engine of FIG. 3.

FIG. 4 is a set of schematic views illustrating one reciprocating operation (two strokes in a four-cycle engine) of the variable compression ratio engine 1 of FIG. 3, that is, a set of views in which the piston 102, upper link 104, lower link 105, crankshaft 103 (journal 112), crankpin 110 and control link 106 are extracted and illustrated. FIG. 4(A) illustrates the piston top dead center, FIG. 4(C) illustrates the piston bottom dead center, FIG. 4(B) illustrates the middle of an intake or power stroke, and FIG. 4(D) illustrates the middle of a compression or exhaust stroke. In each of FIGS. 4(A) to 4(D), the position of the center axis of rotation 103C of the crankshaft 103, as denoted by a filled circle, is fixed with respect to the main body of the engine 1. Similarly, the position of the eccentric shaft part 115 at the lower end of the control link 106, as denoted also by a filled circle, is fixed with respect to the main body of the engine 1 at the eccentric position which is set by the actuator 117 and the control shaft 114. The positions of other pivotal axes as denoted by blank circles relatively vary in accordance with the reciprocating movement of the piston 102 and the operation of the multi-link mechanism 101.

As illustrated in FIG. 4(A), when the actuator 117 is operated to rotate the control shaft 114 to a predetermined position, the position of the eccentric shaft part 115 of the control link 106 is set with respect to the main body of the engine 1. As described above, when increasing the geometric compression ratio of the engine 1, the eccentric shaft part 115 is moved downward relative to the center axis of the control shaft 114. Through this operation, the lower link 105 pivots about the center axis 110C of the crankpin 110 in a direction in which the position of the upper pin 108 moves relatively upward. Conversely, when decreasing the geometric compression ratio of the engine 1, the eccentric shaft part 115 is moved upward relative to the center axis of the control shaft 114. Through this operation, the lower link 105 pivots about the center axis 110C of the crankpin 110 in a direction in which the position of the upper pin 108 moves relatively downward. FIGS. 4(A) to 4(D) illustrate the former case where the eccentric shaft part 115 is moved downward relative to the center axis of the control shaft 114 to allow the lower link 105 to pivot about the center axis 110C of the crankpin 110 in a direction in which the position of the upper pin 108 moves relatively upward, that is, a case where the top dead center position of the piston 102 moves upward to increase the geometric compression ratio of the engine 1.

As illustrated in FIGS. 4(A) to 4(D), the crankpin 110 to which the lower link 105 is coupled rotates on a circular path in one direction around the center axis of rotation 103C of the crankshaft 103. During this operation, the other end of the lower link 105 is coupled to the control link 106 via the control pin 109, and the eccentric shaft part 115 located at the lower end of the control link 106 maintains its fixed position with respect to the engine 1. When the piston 102 moves downward from the top dead center position as illustrated in FIGS. 4(A) to 4(B), therefore, the crankpin 110 rotates around the crankshaft 103 and the control link 106 pivots leftward. With this motion, the lower link 105 moves downward while pivoting leftward.

Then, when the piston 102 moves further downward toward the bottom dead center as illustrated in FIGS. 4(B) to 4(C), the crankpin 110 further rotates around the crankshaft 103, but the control link 106 pivots rightward. With this motion, the lower link 105 moves downward while pivoting further leftward. Then, when the piston 102 moves upward from the bottom dead center as illustrated in FIGS. 4(C) to 4(D), the crankpin 110 further rotates around the crankshaft 103 and the control link 106 further pivots rightward. With this motion, the lower link 105 moves upward while pivoting rightward. Then, when the piston 102 moves further upward toward the top dead center as illustrated in FIGS. 4(D) to 4(A), the crankpin 110 further rotates around the crankshaft 103, but the control link 106 pivots leftward. With this motion, the lower link 105 moves upward while pivoting further rightward.

In the engine 1 having the multi-link mechanism 101 as in the present embodiment, the sum of the inertial forces exerted by the upper link 104, lower link 105 and control link 106 acts as a vibration driving force that causes the main body of the engine 1 to vibrate. This vibration driving force causes the main body of the engine 1 to vibrate not only in a piston movement direction, that is, the vertical direction of the engine, but also in a direction oriented transversely with respect to the piston movement direction (longitudinal direction of the vehicle body in transverse-mounted engines, see FIGS. 3 and 4). The transversely oriented vibrations of the engine include, for example, a second order vibration component related to the engine rotation, and such a second order vibration component is unique to the engine 1 having the multi-link mechanism 101 as in the present embodiment. In the engine 1 having the multi-link mechanism 101 of the present embodiment, the effect of first order vibrations in the transverse direction of the engine is small because the engine 1 is a four-cylinder engine. It is therefore necessary to reduce second and higher order vibrations related to the engine rotation. It is particularly necessary to reduce second order transverse vibrations in the transverse direction of the engine, which cause booming noises inside a vehicle cabin. The order of vibration components refers to an engine rotational period. That is, the first order of vibration component has the same period as the engine rotational period which is the period when the crankshaft 103 rotates once, the second order of vibration component has half of that period, and N-th order of vibration component has one N-th of that period.

In the engine 1 having the multi-link mechanism 101 of the present embodiment, therefore, the mass, shape and other appropriate parameters of each of the upper link 104, lower link 105 and control link 106 are configured such that the sum of second order inertial forces acting in the leftward direction of the engine and the sum of second order inertial forces acting in the rightward direction of the engine are balanced at the center of gravity of each link, as at least any one certain order inertial force of the second or higher order inertial forces related to the engine rotation. With regard to the specific scheme of setting the mass, shape and other appropriate parameters of each link 104, 105, 106, a scheme described in JP5327361B, which is incorporated herein as a reference document and constitutes a part of the present description, can be employed.

When the variable compression ratio engine 1 of the present embodiment is operating in a high load region, for example, the compression ratio is set to a lower compression ratio regardless of the engine speed in order to prevent knocking. Conversely, when the engine 1 is operating in a low to medium load region in which the risk of knocking is low, the compression ratio is set to a higher compression ratio in order to achieve low fuel consumption and increase the torque. In particular, in the engine 1 with a supercharger, knocking may occur due to increase of the supercharging pressure in the high load region and the compression ratio is therefore set to a lower compression ratio thereby to suppress the occurrence of knocking. Thus, the anti-vibration device for vehicles of the present invention may preferably be applied to the variable compression ratio engine 1 with a supercharger which can achieve low fuel consumption while maintaining the torque, particularly by downsizing the engine displacement.

The configuration and action of the variable compression ratio engine 1 of the present embodiment have been described above. According to the variable compression ratio engine 1 of a multi-link mechanism that includes a plurality of links, specifically the upper link 104, lower link 105 and control link 106, between the piston 102 and the crankshaft 103, the motion of the upper link 104 and the motion of the control link 106 in association with the vertical movement of the piston 102 are in reverse phase, so that the occurrence of the inertial forces in the vertical direction due to the second order components related to the engine rotation can be drastically suppressed. In the engine 1 mounted by means of a pendulum mount structure, elastic bodies (insulators) of the right engine mount 3 and left engine mount 4 may have to be rigid because the total weight of the engine 1 is supported at two points of the engine mounts 3 and 4. According to the configuration and action of the variable compression ratio engine 1 of the present embodiment, the vibrations of the mounts in the vertical direction can be drastically reduced and therefore the dynamic springs of elastic bodies in the vertical direction can be reduced in their size.

Moreover, with regard to the transverse forces acting on the center of gravity of each link 104, 105, 106 of the multi-link mechanism, the upper link 104 and control link 106 in reverse phase can cancel such transverse forces and therefore when the center of gravity of the lower link 105 approximately coincides with the position of the crankpin 110, the occurrence of inertial forces (second order components) in the transverse direction can also be drastically suppressed. Furthermore, the torque fluctuation due to combustion can be reduced and the torque fluctuation due to the inertial forces cancels the torque fluctuation due to combustion in reverse phase. In the multi-link mechanism 101 as in the present embodiment, the torque fluctuation due to the inertial forces by the lower link 105 is large and therefore the torque fluctuation within the low rotational speed region can be reduced.

In the high rotational speed region, however, the torque fluctuation due to the inertial forces excites the resonant vibration of the upper torque rod 6. For suppression of such resonance, the upper torque rod 6 is equipped with an inertial mass and an actuator for reciprocating the inertial mass, which will be described later, to enhance the vibration attenuation characteristics of the inertial mass of the upper torque rod 6, thereby suppressing the torque fluctuation due to the inertial forces within a high rotational speed region. As will be understood, control may be performed to directly cancel the vibration driving force due to the torque fluctuation. According to such a configuration as in the present embodiment, therefore, even in a high-power engine of an in-line four-cylinder engine as substitute for a V-type six-cylinder engine, enhanced power performance, improved fuel consumption, and quietness comparable with that of a V-type six-cylinder engine can be realized with a reduced weight and lower cost.

The variable compression ratio engine 1 having the multi-link mechanism 101, however, may involve some problems to be solved. That is, the upper torque rod 6 may have to be improved in the anti-vibration characteristics by reducing the eigen value in the axial direction, but this may concurrently reduce the pitching eigen value. Conventionally, the eigen value with which a first elastic connecting part at one side vibrates and the eigen value with which a second elastic connecting part at the other side vibrates may be set, for example, respectively at 70 Hz and 150 Hz, which are relatively separate frequencies, but as the engine torque increases, the vibration eigen values of both the elastic connecting parts may possibly be set within a medium frequency range of around 100 Hz to ensure the durability of elastic bodies of the upper torque rod 6. In such cases, problems may not occur under full load conditions because of lower turning points of the torque fluctuation, but pitching vibrations will be excited under low load conditions, which may cause booming noises. In the variable compression ratio engine 1 according to one or more embodiments of the present invention, the upper torque rod 6 is composed of an active anti-vibration device that controls prevention of vibrations to suppress such booming noises which increase due to the resonance of the upper torque rod 6.

Figure 5:
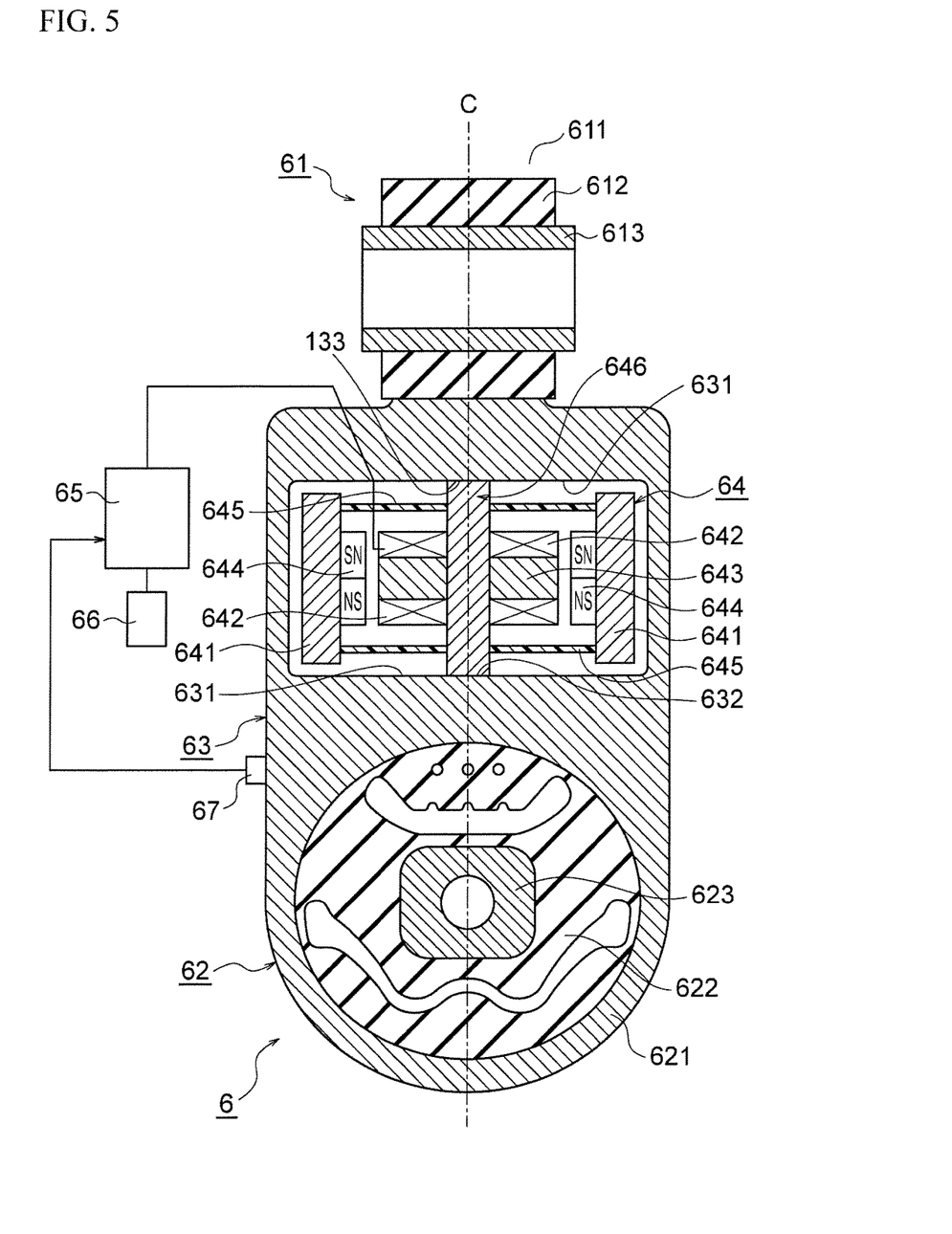
FIG. 5 is a cross-sectional view illustrating an example of the upper torque rod illustrated in FIG. 1B, FIG. 2 and FIG. 4.
Figure 6:
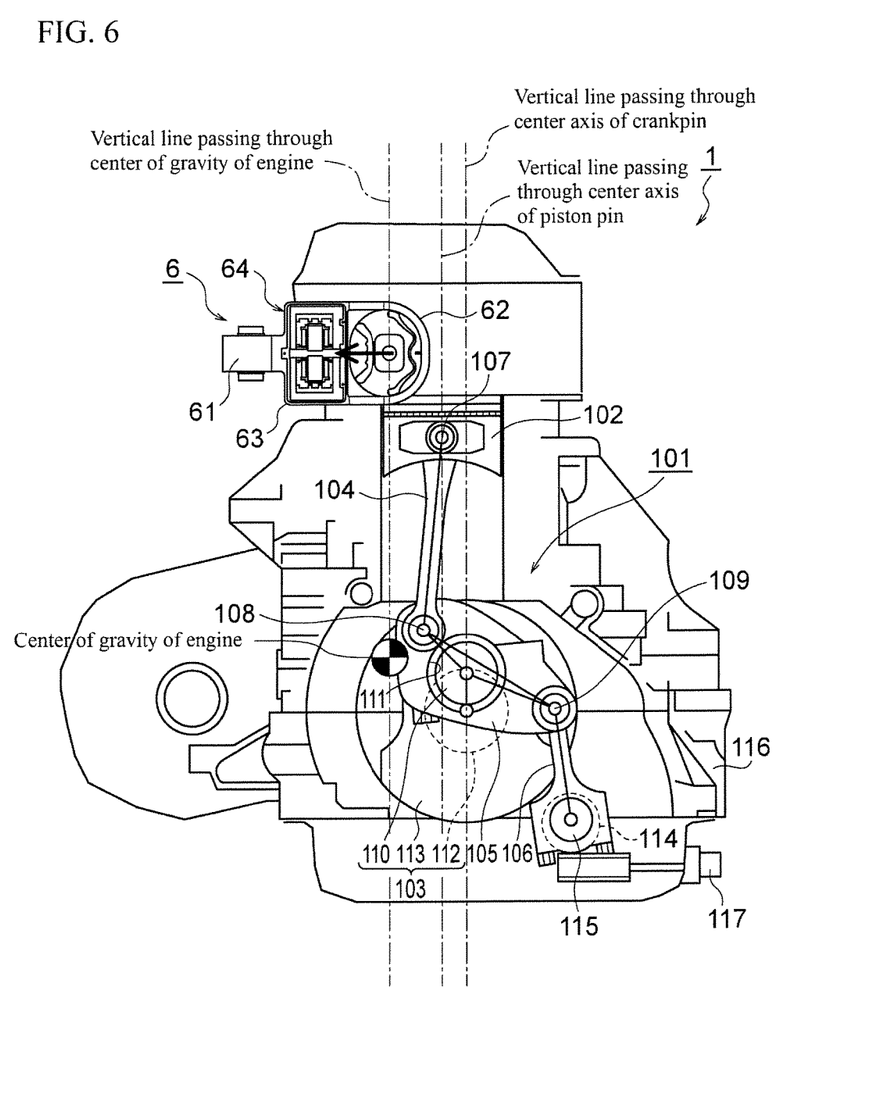
FIG. 6 is a side elevational view (partially including a cross-sectional view) illustrating an example of the state in which the upper torque rod is attached to the variable compression ratio engine of FIG. 3.

Next, the upper torque rod 6 as an active anti-vibration device according to the present embodiment will be described. FIG. 5 is a cross-sectional view illustrating an example of the upper torque rod illustrated in FIG. 1B and FIG. 2, and FIG. 6 illustrates a specific state in which the upper torque rod is attached to the variable compression ratio engine 1. As illustrated in FIG. 5, the upper torque rod 6 of the present embodiment comprises a rod body 63 that has a first elastic connecting part 61 and a second elastic connecting part 62 at both ends, an actuator 64 that is supported by the rod body 63, a control unit 65 that controls the actuator 64, and a power supply 66 that supplies electric power to the control unit 65.

The rod body 63 is composed of a metal material, such as iron and aluminum, or a synthetic resin material. One end of the rod body 63 is formed integrally with an outer tube 611 of the first elastic connecting part 61 and the other end is formed integrally with an outer tube 621 of the second elastic connecting part 62. The first elastic connecting part 61 is connected to the vehicle body and the second elastic connecting part 62 is connected to the engine 1. The axis of the first elastic connecting part 61 and the axis of the second elastic connecting part 62 are in a relationship of skew lines of which one is rotated by 90° with respect to the other because of the connection layout to the vehicle body and the engine 1, but they may be parallel to each other or may be in a relationship of skew lines of which one is rotated by any angle with respect to the other in the anti-vibration device 6 according to the present invention. In an alternative embodiment, the first elastic connecting part 61 may be connected to the engine 1 and the second elastic connecting part 62 may be connected to the vehicle body.

The first elastic connecting part 61 comprises a cylindrical outer tube 611, a cylindrical inner tube 613 that is concentric with the outer tube 611, and an elastic body (anti-vibration material also referred to as an insulator) 612 that couples the outer tube 611 and the inner tube 613. The first elastic connecting part 61 is fixed to a vehicle frame using a bolt B1 for the inner tube 613, as illustrated in FIG. 2. The elastic body 612 is a member that has both the spring function and the attenuating function. For example, an elastic rubber can be used as the elastic body 612. The elastic body 612 is fixed to the outer tube 611 and the inner tube 613 using an adhesive or the like.

Like the above first elastic connecting part 61, the second elastic connecting part 62 comprises a cylindrical outer tube 621, a cylindrical inner tube 623 that is concentric with the outer tube 621, and an elastic body (anti-vibration material) 622 that couples the outer tube 621 and the inner tube 623. The second elastic connecting part 62 is fixed to the engine 1 using a bolt B2 for the inner tube 623, as illustrated in FIG. 2. The elastic body 622 is a member that has both the spring function and the attenuating function. For example, an elastic rubber can be used as the elastic body 622. The elastic body 622 is fixed to the outer tube 621 and the inner tube 623 using an adhesive or the like.

The rigidity (spring constant) of each of the elastic body 612 of the first elastic connecting part 61 and the elastic body 622 of the second elastic connecting part 62 is determined, in consideration of the mass of the rod body 63 between these two elastic bodies 612 and 622 (including the outer tubular parts of the first elastic connecting part 61 and second elastic connecting part 62), to be a value that allows the rigid body resonance A of the above-described variable compression ratio engine 1 and the rigid body resonance B of the rod body 63 to be of lower frequencies than the resonant frequencies of bending and/or torsion of the engine 1. The double anti-vibration effect can thus be obtained, which is an effect of preventing the vibrations transmitted from the engine 1 to the vehicle body frame by allowing the rigid body resonance A of the engine 1 and the rigid body resonance B of the rod body 63 to occur at two different frequencies, that is, to occur at a frequency f1 around 70 Hz within a low frequency range and at a frequency f2 of around 150 Hz within a medium frequency range. It is to be noted, however, that the anti-vibration device 6 according to one or more embodiments of the present invention may not necessarily have different diameters of the outer tubes 611 and 621 and inner tubes 613 and 623 of the first elastic connecting part 61 and second elastic connecting part 62, and the first elastic connecting part 61 and the second elastic connecting part 62 may have the same structure. That is, to ensure the durability of the elastic bodies 612 and 622 of the upper torque rod 6 as an anti-vibration device, the rigidity (spring constant) of each of the elastic body 612 of the first elastic connecting part 61 and the elastic body 622 of the second elastic connecting part 62 may be set such that the vibration eigen value falls within a medium frequency range of around 100 Hz, for example, 100 Hz±10 Hz.

The middle portion of the rod body 63 of this example is formed with an actuator chamber 631 that houses the actuator 64. The cross section of the actuator chamber 631 is a rectangular shape. As illustrated in FIG. 5, the actuator 64 is a linear-type actuator, or a so-called linear motion-type actuator, which includes a coil 642, a rectangular tube-like core 643, permanent magnets 644, an inertial mass 641, elastic support springs 645, and a shaft 646 that is disposed on a rod axis of the actuator chamber 631. The actuator 64 operates to reciprocate the inertial mass 641 in the rod axis direction of the shaft 646.

The inertial mass 641 is composed of a metal material or the like having magnetic property and provided coaxially with the shaft 646 around the shaft 646. When viewed in the rod axis direction of the shaft 646, the cross section of the inertial mass 641 is shaped to be point-symmetrical around the center axis (center of gravity) of the shaft 646, and the center of gravity of the inertial mass 641 coincides with the center axis of the shaft 646. The inertial mass 641 of this example is shaped in a rectangular tube, and both ends of the inertial mass 641 in the rod axis direction (upper and lower ends in FIG. 5) are connected to the shaft 646 via the elastic support springs 645. Each of the elastic support springs 645 is composed, for example, of a plate spring that has relatively small rigidity. The permanent magnets 644 are fixed to an inner wall of the inertial mass 641 in a magnetic-pole arrangement as illustrated in FIG. 5.

The core 643 which forms a magnetic path of the coil 642 is composed of laminated steel plates and fixed to the shaft 646. The core 643 is divided into a plurality of members prior to assembly of the actuator 64, and these members are bonded to the periphery of the shaft 646 using an adhesive thereby to constitute the rectangular tube-like core 643 as a whole. The coil 642 is wound around this rectangular tube-like core 643. The permanent magnets 644 fixed to the inner wall of the inertial mass 641 are provided so as to face the core 643 and the coil 642.

An acceleration sensor 67 is attached to the rod body. The acceleration sensor 67 detects vibrations transmitted from the variable compression ratio engine 1 to the upper torque rod 6, as acceleration. A detection signal representing the acceleration in the rod axis direction C from the acceleration sensor 67 is input to a voltage amplifying circuit via a band pass filter that is provided in the control unit 65. The amplified signal by the voltage amplifying circuit is applied to the coil 642 of the actuator 64 as an output signal from the control unit 65 (control of voltage is performed). The acceleration sensor 67 may preferably be provided in the vicinity of the rotational center axis of pitching, which is directed from the surface to the back of the plane of FIG. 5, because in this case the influence of pitching may be small.

The actuator 64 of this example configured as the above drives the inertial mass 641 to reciprocate linearly, that is, to reciprocate in the axial direction C of the rod body of the shaft 646 using a reluctance torque due to the magnetic field generated by the coil 642 and the permanent magnets 644. The winding wire of the coil 642 of this example is connected to the control unit 65 which includes a drive circuit for the actuator 64, and the electric power from the power supply 66 is supplied to the coil 642.

The present invention will be described with reference to various embodiments for a layout of mounting the above-described variable compression ratio engine 1 to a vehicle body and a layout of attaching the upper torque rod 6 as an active anti-vibration device. Preconditions common in the embodiments described below are as follows:

(1) in the variable compression ratio engine 1 as a vibrating source, the upper link 104, lower link 105 and control link 106 are configured such that at least any one certain order inertial force of the second or higher order inertial forces related to the engine rotation acts at least on the upper link 104 and the control link 106 in the right-and-left transverse direction with respect to the movement direction of the piston 102 and the sum of the certain order inertial force in the leftward direction and the certain order inertial force in the rightward direction are balanced at the center of gravity of each link 104, 105, 106;

(2) the variable compression ratio engine 1 as a vibrating source is mounted to a vehicle body by means of a pendulum mount structure (so-called four-point support using two engine mounts 3 and 4 and two torque rods 5 and 6);

(3) the reciprocal movement axis of the piston 102 of the variable compression ratio engine 1 is set at a position that is offset from the vertical line passing through the center axis of rotation 103C of the crankshaft 103; and (4) the rigid body resonance frequency of the torque rod 6 is set lower than the resonant frequencies of bending and/or torsion of the variable compression ratio engine 1.

This will be more specifically described. Engines with superchargers of small engine displacement are proposed (so-called downsizing of engines). Such superchargers may be turbochargers or mechanical superchargers which increase the intake air pressure to a pressure higher than the atmospheric pressure for the purposes of improving the fuel consumption and reducing the weight of engines. That is, multicylinder engines, such as large displacement engines of 2000 cc or more and V-six type engines, which would have problems in the fuel consumption, may be substituted by engines of a reduced displacement and/or less number of cylinders, and in such cases superchargers can compensate for the reduced output torque as the engine displacement decreases. Reducing the number of cylinders, however, lowers the main order (frequency) of vibration driving of engine (e.g., the third order related to engine rotation in a V-six engine will be substituted by the second order component related to engine rotation in an in-line four-cylinder engine (L4 engine)), and the vibration driving force to a vehicle at the basic order increases. In addition, the four-point mount structure (pendulum mount structure), which has conventionally been used for L4 engines, cannot ensure the quietness because the high-frequency engine vibrations also increase, and it may be necessary to select the six-point mount structure (cross-type mount structure) which has been used for large-size engines. In such cases, the anti-vibration function by the sub-frame can avoid noises at the time of acceleration, but an active mount may have to be used to respond to booming noises at low frequencies. Moreover, the cross-type mount structure has problems in the increased cost and weight compared with the pendulum mount structure, such as that the number of components increases as the number of mounts increases.

In this context, according to one or more embodiments of the present invention, the variable compression ratio engine 1 satisfying the above preconditions of (1) to (4) is employed as an engine, and the motion of the upper link 104 and the motion of the control link 106 in association with the vertical movement of the piston 102 are in reverse phase, so that the occurrence of the inertial forces in the vertical direction due to the second order components related to the engine rotation can be drastically suppressed. In the engine 1 mounted by means of a pendulum mount structure, elastic bodies (insulators) of the right engine mount 3 and left engine mount 4 may have to be rigid because the total weight of the engine 1 is supported at two points of the engine mounts 3 and 4. According to one or more embodiments of the present invention, the vibrations of the mounts in the vertical direction can be drastically reduced and therefore the dynamic springs of elastic bodies in the vertical direction can be reduced in their size. Moreover, with regard to the transverse forces acting on the center of gravity of each link 104, 105, 106 of the multi-link mechanism, the upper link 104 and control link 106 in reverse phase can cancel such transverse forces and therefore when the center of gravity of the lower link 105 approximately coincides with the position of the crankpin 110, the occurrence of inertial forces (second order components) in the transverse direction can also be drastically suppressed. Furthermore, the torque fluctuation due to combustion can be reduced and the torque fluctuation due to the inertial forces cancels the torque fluctuation due to combustion in reverse phase. In the multi-link mechanism 101 as in one or more embodiments of the present invention, the torque fluctuation due to the inertial forces by the lower link 105 is large and therefore the torque fluctuation within the low rotational speed region can be reduced.

When employing the variable compression ratio engine 1 having the multi-link mechanism 101, another problem may arise. That is, the upper torque rod 6 may have to be improved in the anti-vibration characteristics by reducing the eigen value in the axial direction, but this may concurrently reduce the eigen value in the pitching direction. In such cases, pitching vibrations will be excited under low load conditions, which may cause booming noises. According to one or more embodiments of the present invention, as described above, the upper torque rod 6 is composed of an active anti-vibration device that controls prevention of vibrations to suppress such booming noises which increase due to the resonance of the upper torque rod 6. Thus, a vehicle can be provided which have the improved fuel consumption, enhanced power performance (output torque), and anti-vibration performance (quietness) in a balanced manner.

First Embodiment

When the above-described upper torque rod 6 as an active anti-vibration device is attached between the variable compression ratio engine 1 and a vehicle body, in one or more embodiments of the present invention, the second elastic connecting part 62 of the upper torque rod 6 is connected, as illustrated in FIG. 6, to the upper part of the engine 1 so that the second elastic connecting part 62 is located on the vertical line which passes through the center of gravity of the engine 1. In addition, the first elastic connecting part 61 is connected to the vehicle body so that the rod body 63 is horizontal along the roll direction of the engine 1. The precondition for this layout is that the variable compression ratio engine 1 according to one or more embodiments of the present invention is mounted to (supported by) the vehicle body using a pendulum mount structure so that the reciprocal movement axis of the piston 102 coincides with the vertical direction.

Pitching vibrations of the upper torque rod 6 tend to be excited under low load conditions of the variable compression ratio engine 1, but when the second elastic connecting part 62 of the upper torque rod 6 is located on the vertical line including the center of gravity which is the rotational center axis of vibrations of the engine 1, the rotational span of the vibrations is minimum and the input to the upper torque rod 6 is also minimum. The effect of anti-vibration is therefore the best. Moreover, this layout allows the input of vertical vibrations to the upper torque rod 6 to be minimized and another effect can be obtained that the pitching vibrations of the upper torque rod 6 are less likely to be excited. Furthermore, the variable compression ratio engine 1 has a high degree of freedom in relation to other engine components, such as when the second elastic connecting part 62 of the upper torque rod 6 is disposed at that position, because the piston 102 is offset from the center axis of rotation 103C of the crankshaft 103.

Figure 7A:
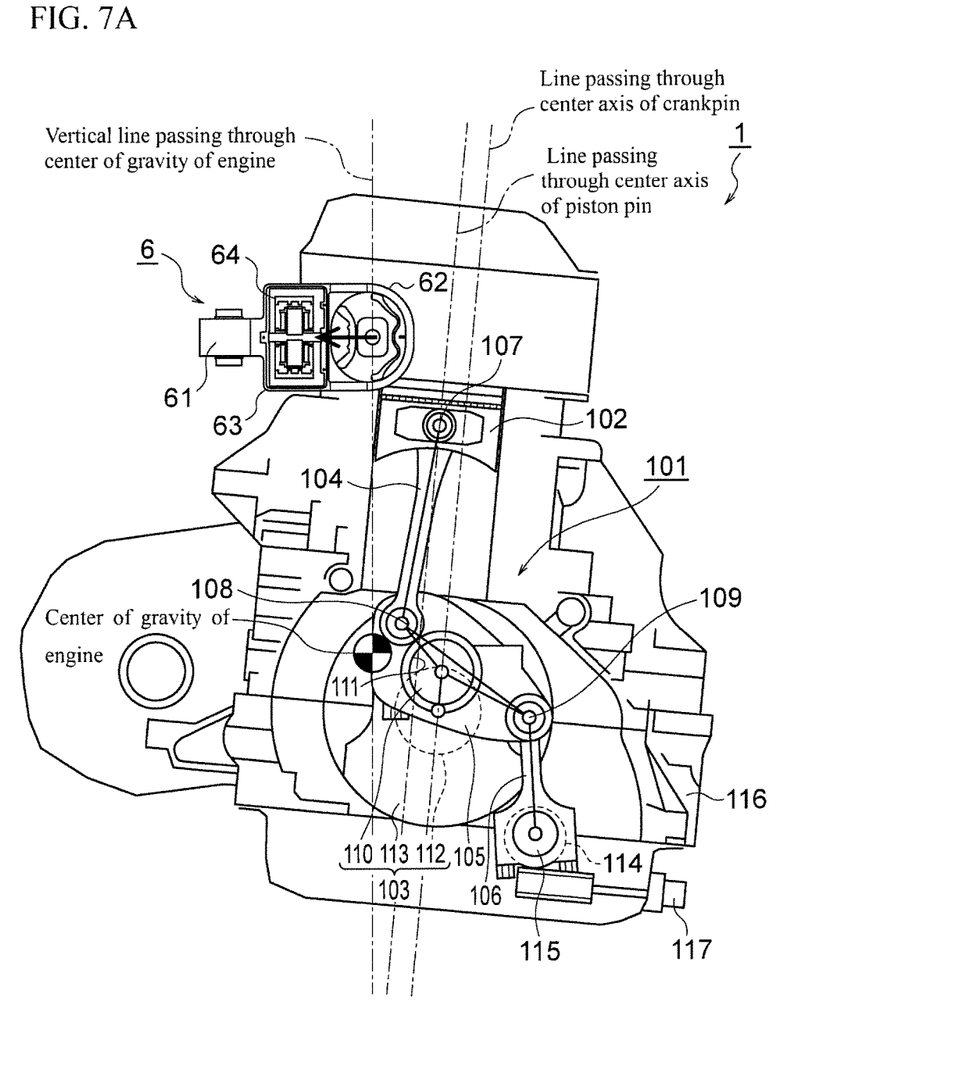
FIG. 7A is a side elevational view (partially including a cross-sectional view) illustrating another example of the state in which the upper torque rod is attached to the variable compression ratio engine of FIG. 3.
Figure 7B:
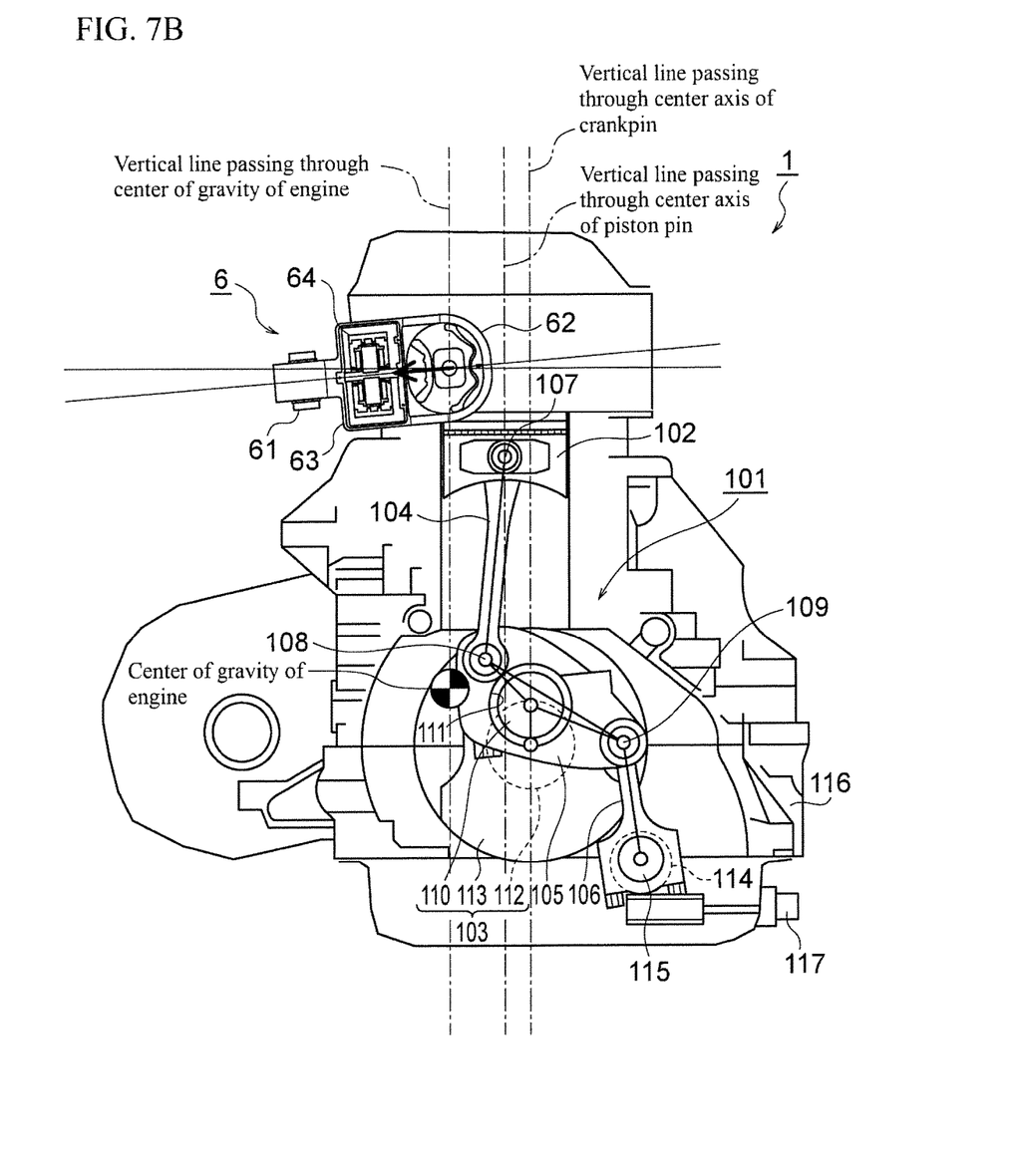
FIG. 7B is a side elevational view (partially including a cross-sectional view) illustrating still another example of the state in which the upper torque rod is attached to the variable compression ratio engine of FIG. 3.

When, as illustrated in FIG. 6, the second elastic connecting part 62 of the upper torque rod 6 is located on the vertical line including the center of gravity of the variable compression ratio engine 1 and the upper torque rod 6 is horizontally attached, pitching vibrations of the upper torque rod 6 are less likely to be excited. In a strict sense, however, the vibration driving force (vibration) input from the engine 1 to the second elastic connecting part 62 of the upper torque rod 6 has slight components in the pitching direction as the second elastic connecting part 62 is separate from the center of gravity of the engine 1 by a distance. To cope with this, provided that the layout in the engine room of the vehicle body and the engine 1 is acceptable, the engine 1 may be inclined frontward around the center of gravity, for example as illustrated in FIG. 7A, and the upper torque rod 6 may be horizontally attached. Alternatively, as illustrated in FIG. 7B, the engine 1 may be mounted to the vehicle body in the vertical direction and the upper torque rod 6 may be inclined with its rear located lower than its front. The inclination angle in each case may be set to be an angle such that the components of the vibration driving force input to the upper torque rod 6 in the pitching direction comes to zero, that is, may be set such that the vibration driving force is aligned with the rod axis direction C of the upper torque rod 6. Through this setting, the pitching vibrations of the upper torque rod 6 are further less likely to be excited and the actuator 64 can control prevention of vibrations to suppress the booming noises which may occur under low load conditions.

Second Embodiment

The above first embodiment is described for the anti-vibration device when horizontal vibrations are not input to the upper torque rod 6 or are at a negligible level if input. If, on the other hand, horizontal vibrations are input to the upper torque rod 6 for some reason, the structure of the upper torque rod 6 may be configured as below. That is, the mass, shape and other appropriate parameters of the upper torque rod 6 may be set such that the relationship of I/mab≤1±0.1 is satisfied, where "m" represents the mass of the upper torque rod 6 including the rod body 63 and the actuator 64, "I" represents the moment of inertia of the upper torque rod 6, "a" represents a first distance from the center of gravity of the upper torque rod 6 to the center of mounting at the vehicle body side, and "b" represents a second distance from the center of gravity of the upper torque rod 6 to the center of mounting of the variable compression ratio engine 1. That is, the upper torque rod 6 of this example satisfies a relationship of 90%≤I/mab≤110%. The detailed principle is as disclosed in WO2013/161544 by the present inventors, which is incorporated herein as a reference document and constitutes a part of the present description.

Overview is as follows. Regarding the dynamic spring characteristics of the upper torque rod 6 for shutting off the force transmitted from the variable compression ratio engine 1 to the vehicle body, motion equations for the vertical direction of vehicle (direction in which the pitching and bounce of the upper torque rod are problematic) can be organized into $f_z/z_0 \cdot \cos \omega t = k_{z1} k_{z2} (I-mab) \omega^2/\alpha$, so the dynamic spring constant decreases infinitely when I−mab=0 (I/mab=1). The mass of the upper torque rod 6 "m," the moment of inertia of the upper torque rod 6 "I," and the distances from the center of gravity of the upper torque rod 6 to both ends "a" and "b" satisfy I/mab≤1±0.1 when the mass and/or shape of the upper torque rod 6 as a rigid body are appropriately set. This can suppress noises in the vehicle cabin which are caused by the vibrations transmitted from the variable compression ratio engine 1.

Figure 8:
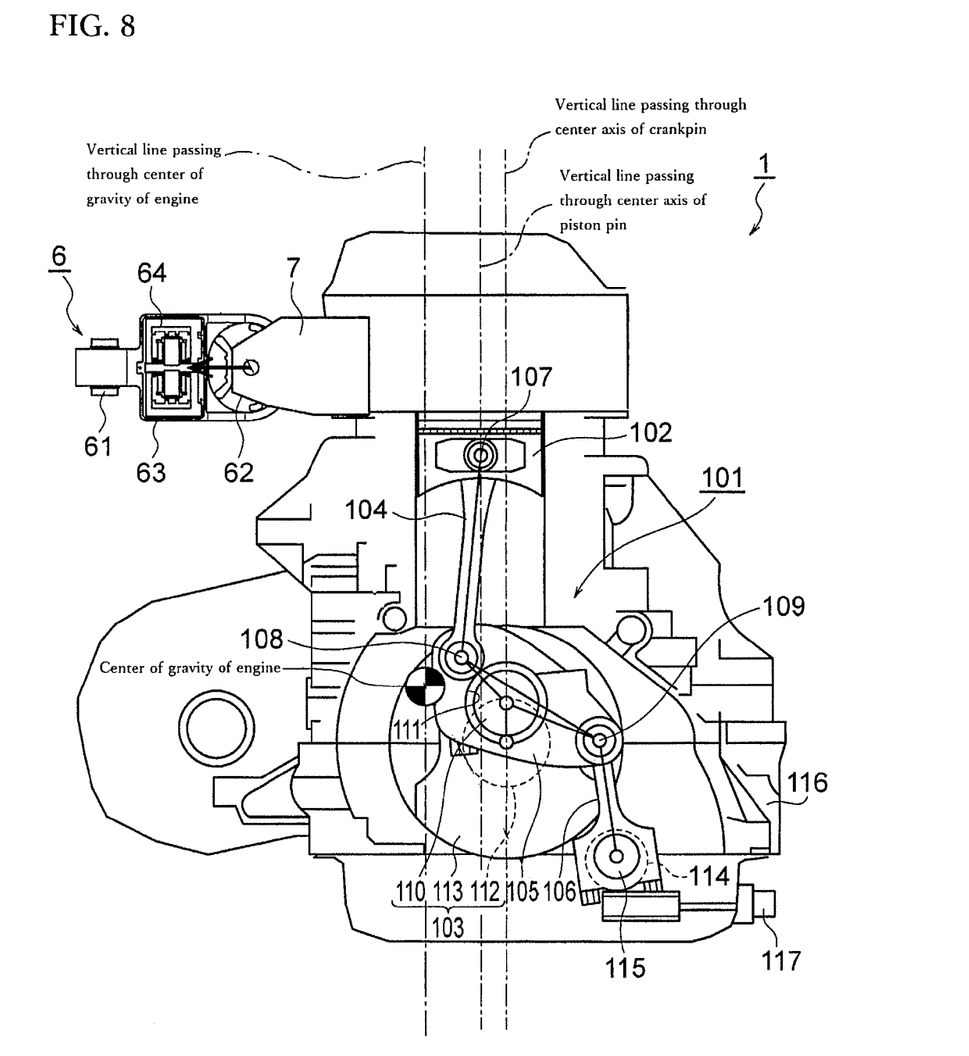
FIG. 8 is a side elevational view (partially including a cross-sectional view) illustrating a further example of the state in which the upper torque rod is attached to the variable compression ratio engine of FIG. 3.

FIG. 8 is a cross-sectional view when the upper torque rod 6, of which the mass, shape and other appropriate parameters are set such that the relationship of 1/mab≤1±0.1 is satisfied as the above, is attached between the upper part of the variable compression ratio engine 1 and the vehicle body. As illustrated in FIG. 8, when the second elastic connecting part 62 cannot be disposed on the vertical line including the center of gravity of the engine 1, in relation to other components attached to the engine 1, unlike the case illustrated in FIG. 6, FIG. 7A or FIG. 7B, the upper torque rod 6 may be coupled to the engine 1 via a torque rod bracket 7 or other appropriate member. That is, the second elastic connecting part 62 of the upper torque rod 6 is connected to one end of the torque rod bracket 7 while the other end of the torque rod bracket 7 is connected to the engine 1.

In the upper torque rod 6 of the present embodiment, the mass, shape and other appropriate parameters of the upper torque rod 6 are set such that the above relationship of I/mab≤1±0.1 is satisfied for the first distance "a" and second distance "b" when the engine is operating in a region for anti-vibration. Here, the above relationship of I/mab≤1±0.1 may be substituted by a relational expression with consideration for elements of torsional stiffness of the upper torque rod 6. In addition or alternatively, the mass, shape and other appropriate parameters of the upper torque rod 6 may be set such that the above relationship of I/mab≤1±0.1 is satisfied for the first distance "a" and second distance "b" under low load conditions because, as described above, the primary object of the present embodiment is to control prevention of vibrations under the low load conditions of the variable compression ratio engine 1. The upper torque rod 6 according to one or more embodiments of the present invention may not necessarily have to be horizontally attached and may also be in an orientation in accordance with the layout in the engine room, provided that the above relationship of I/mab≤1±0.1 is satisfied.

As the above, according to the anti-vibration device for vehicles of one or more embodiments of the present invention, the upper torque rod 6 as an active anti-vibration device may support the engine, which is generating a high torque at a low rotational speed, to exert the anti-vibration characteristics and can therefore suppress the noises, such as booming noises, particularly when the engine is operating under low load conditions. That is, a vehicle can be provided which has improved fuel consumption, enhanced power performance, and quiet cabin condition comparable with that of a V6-type engine.

The above control unit 65 corresponds to the control means or unit according to the present invention.

DESCRIPTION OF REFERENCE NUMERALS

1 Engine
101 Multi-link mechanism (Compression ratio varying mechanism)
102 Piston
103 Crankshaft
103C Center axis of rotation of crankshaft
104 Upper link
105 Lower link
106 Control link
107 Piston pin
108 Upper pin
109 Control pin
110 Crankpin
110C Center axis of crankpin
111 Coupling hole
112 Journal
113 Counterweight
114 Control shaft
115 Eccentric shaft part (Pivot shaft)

116 Cylinder block
117 Actuator
2 Sub-frame
3 Right engine mount
4 Left engine mount
5 Lower torque rod assembly
6 Upper torque rod assembly
7 Torque rod bracket
61 First elastic connecting part
611 Outer tube
612 Elastic body
613 Inner tube
62 Second elastic connecting part
621 Outer tube
622 Elastic body
623 Inner tube
63 Rod body
631 Actuator chamber
632, 633, 634 Hole
64 Actuator
641 Inertial mass
642 Coil
643 Core
644 Permanent magnet
645 Elastic support spring
646 Shaft
65 Control unit
66 Power supply
67 Vibration detection sensor
C Axial direction of rod body

The invention claimed is:

1. An anti-vibration device for vehicles, comprising:
a rod body having a first elastic connecting part at one end and a second elastic connecting part at another end, the second elastic connecting part being connected to a variable compression ratio engine, the first elastic connecting part being connected to a vehicle body to which the variable compression ratio engine is mounted;
an inertial mass supported by the rod body;
an actuator configured to reciprocate the inertial mass in an axial direction of the rod body; and
a control unit configured to control the actuator such that the inertial mass receives force in accordance with a displacement speed of the rod body in the axial direction, wherein
the variable compression ratio engine is provided with a multi-link mechanism between a piston and a crankshaft, the multi-link mechanism including an upper link, a lower link and a control link,
the anti-vibration device is attached between an upper part of the variable compression ratio engine and the vehicle body,
the rod body has a rigid body resonance frequency lower than a resonant frequency of bending and torsion of the variable compression ratio engine, and
each of vibration engine frequencies of the first elastic connecting part and the second elastic connecting part in a pitching direction is within a range of 100±10 Hz.

2. The anti-vibration device for vehicles according to claim 1, wherein
the second elastic connecting part is disposed on a vertical line including a center of gravity of the variable compression ratio engine.

3. The anti-vibration device for vehicles according to claim 1, wherein
the variable compression ratio engine is mounted to the vehicle body such that a reciprocal movement axis of the piston is inclined frontward with respect to the vehicle body, and
the rod body is horizontally attached.

4. The anti-vibration device for vehicles according to claim 1, wherein
the variable compression ratio engine is mounted to the vehicle body such that a reciprocal movement axis of the piston is along a vertical direction, and
the rod body is attached such that the rod body is inclined with the first elastic connecting part located lower than the second elastic connecting part.

5. An anti-vibration device for vehicles, comprising:
a rod body having a first elastic connecting part at one end and a second elastic connecting part at another end, the second elastic connecting part being connected to a variable compression ratio engine, the first elastic connecting part being connected to a vehicle body to which the variable compression ratio engine is mounted;
an inertial mass supported by the rod body;
an actuator configured to reciprocate the inertial mass in an axial direction of the rod body; and
a control unit configured to control the actuator such that the inertial mass receives force in accordance with a displacement speed of the rod body in the axial direction, wherein
the variable compression ratio engine is provided with a multi-link mechanism between a piston and a crankshaft, the multi-link mechanism including an upper link, a lower link and a control link,
the anti-vibration device is attached between an upper part of the variable compression ratio engine and the vehicle body,
the rod body has a rigid body resonance frequency lower than a resonant frequency of bending and torsion of the variable compression ratio engine,
the second elastic connecting part is connected to the variable compression ratio engine at a position that is offset from a vertical line passing through a center of gravity of the variable compression ratio engine, and
an expression $0.9 \leq I/mab \leq 1.1$ is satisfied, where "m" represents a mass of the rod body including the inertial mass and the actuator, "I" represents a moment of inertia of the rod body, "a" represents a first distance from a center of gravity of the rod body to a center of mounting with the vehicle body, and "b" represents a second distance from the center of gravity of the rod body to a center of mounting with the variable compression ratio engine.

6. The anti-vibration device for vehicles according to claim 1, wherein the variable compression ratio engine is mounted to the vehicle body by means of a pendulum mount structure.

7. The anti-vibration device for vehicles according to claim 1, wherein
a reciprocal movement axis of the piston of the variable compression ratio engine is set at a position offset from a center axis of the crankshaft, and
the rod body is attached between the variable compression ratio engine and the vehicle body along a roll direction of the variable compression ratio engine.

* * * * *